(12) United States Patent
Sung et al.

(10) Patent No.: US 12,676,923 B2
(45) Date of Patent: Jul. 7, 2026

(54) HINGE ASSEMBLY AND TERMINAL DEVICE

(71) Applicant: Chiun Mai Communication Systems, Inc., New Taipei (TW)

(72) Inventors: Fu-Hsin Sung, New Taipei (TW); Meng-Yu Chou, New Taipei (TW); Chia-Ju Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 547 days.

(21) Appl. No.: 18/114,921

(22) Filed: Feb. 27, 2023

(65) Prior Publication Data

US 2024/0022654 A1     Jan. 18, 2024

(30) Foreign Application Priority Data

Jul. 18, 2022    (CN) .......................... 202210843386.7

(51) Int. Cl.
    *H04M 1/02*        (2006.01)
    *F16C 11/04*       (2006.01)
    *H04W 88/06*       (2009.01)

(52) U.S. Cl.
    CPC .......... *H04M 1/0216* (2013.01); *F16C 11/04* (2013.01); *H04M 1/0268* (2013.01); *H04W 88/06* (2013.01)

(58) Field of Classification Search
    None
    See application file for complete search history.

(56) References Cited

U.S. PATENT DOCUMENTS

| | | | |
|---|---|---|---|
| 6,474,711 B2 | 11/2002 | Kazerooni | |
| 2006/0236505 A1* | 10/2006 | Maatta .................. | G06F 1/1681 |
| | | | 16/366 |
| 2019/0163241 A1* | 5/2019 | Moon ................... | G06F 1/1641 |
| 2022/0303371 A1* | 9/2022 | Liao ..................... | H04M 1/0216 |
| 2024/0183383 A1* | 6/2024 | Ying-Hsing ........... | F16C 11/04 |
| 2024/0201740 A1* | 6/2024 | Zhang ................. | H04M 1/0206 |

FOREIGN PATENT DOCUMENTS

| | | |
|---|---|---|
| CN | 107688369 A | 2/2018 |
| CN | 113124292 A | 7/2021 |

\* cited by examiner

*Primary Examiner* — San Htun
(74) *Attorney, Agent, or Firm* — ScienBiziP, P.C.

(57) ABSTRACT

A hinge assembly includes two hinge arms, a fixing structure, and a plurality of balls. Each of the two hinge arms includes a gear portion. A shaft hole and at least one groove are defined on the gear portion, and the shaft hole connects to the at least one groove. The fixing structure includes two central shafts, each of the two central shafts passes through the shaft hole respectively. Each ball is accommodated in the at least one groove. The balls are in interference fit with the two central shafts. The balls and the two central shafts generate a damping force while they rotate relative to each other or tend to rotate relative to each other to maintain the position of the two hinge arms. The hinge assembly has a long service life and sufficient space. A terminal device is provided according to the present disclosure.

10 Claims, 12 Drawing Sheets

<u>200</u>

101'

81'

102'

82'

81'

103'

104'

100

HINGE ASSEMBLY AND TERMINAL DEVICE

CROSS-REFERENCE TO RELATED APPLICATIONS

This is a new application which is based on and claims priority to China Patent Application No. 202210843386.7 filed on Jul. 18, 2022, the contents of which are incorporated by reference herein.

FIELD

The subject matter herein generally relates to mechanical technologies, in particular to a hinge assembly and a terminal device having the hinge assembly.

BACKGROUND

Hinge assembly with self-locking functions is widely used in terminal device. With the miniaturization design of the terminal device, the size of the hinge assembly in the terminal device becomes smaller. However, small size may result in a decrease of the strength of the hinge assembly, causing the service life of the hinge assembly to be shortened. In addition, the existing hinge assembly may not be able to rotate smoothly, thereby affecting the user experience.

BRIEF DESCRIPTION OF THE DRAWINGS

Implementations of the present technology will now be described, by way of example only, with reference to the attached figures.

DETAILED DESCRIPTION

Figure 1:
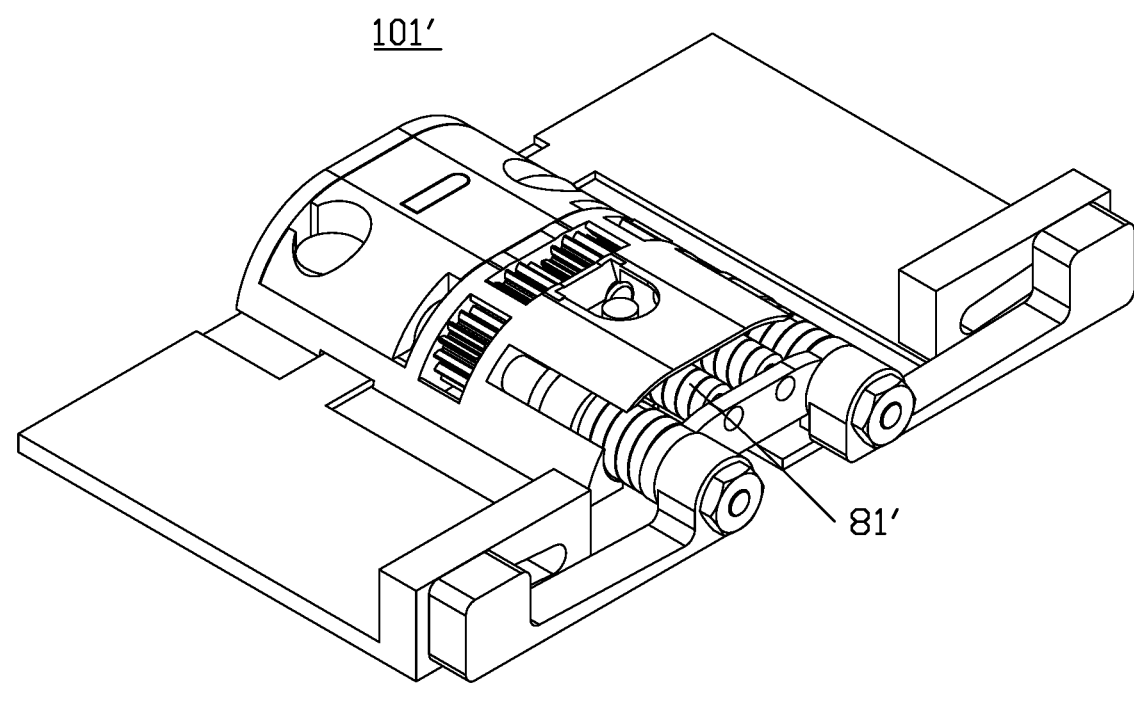
FIG. 1 is a diagrammatic view of an embodiment of a hinge assembly according to the related art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, a hinge assembly 101' including a spring 81' is provided in the related art. The hinge assembly 101' has a self-locking function, and the spring 81' is compressed when the hinge assembly 101' is locked. An elastic force of the spring 81' also provides a damping force when the hinge assembly 101' is locked. The value of the resisting force is changed during the compression and rebound processes of the spring 81'. Therefore, sufficient space is needed to enable the spring 81' to be compressed and rebounded, resulting in a large space occupied by the hinge assembly 101'. When the size of each component of the hinge assembly 101' is reduced to meet the requirements of a miniaturized terminal device, the service life of the hinge assembly 101' will be shortened.

Figure 2:
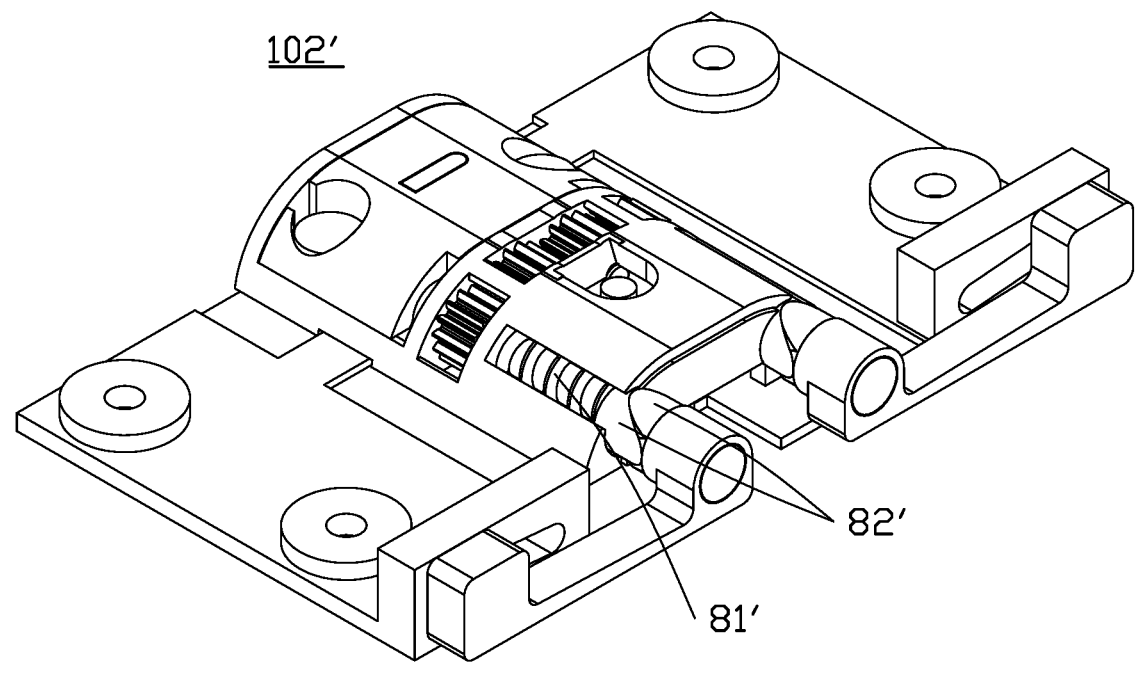
FIG. 2 is a diagrammatic view of another embodiment of a hinge assembly according to the related art.

Referring to FIG. 2, a hinge assembly 102' including a spring 81' and two cams 82' is also provided in the related art. The spring 81' is compressed or rebounded by changing the relative position of the cams 82'. Similarly, the hinge assembly 102' takes up a lot of space, but reducing the size of each component of the hinge assembly 102' will shorten the service life of the hinge assembly 102'. In addition, the shape of the cams 82' is not flat, so when a product including the hinge assembly 102' is in use, there will be a pause during the rotation of the hinge assembly 102', and the user will feel that the rotation is not smooth.

Figure 3:
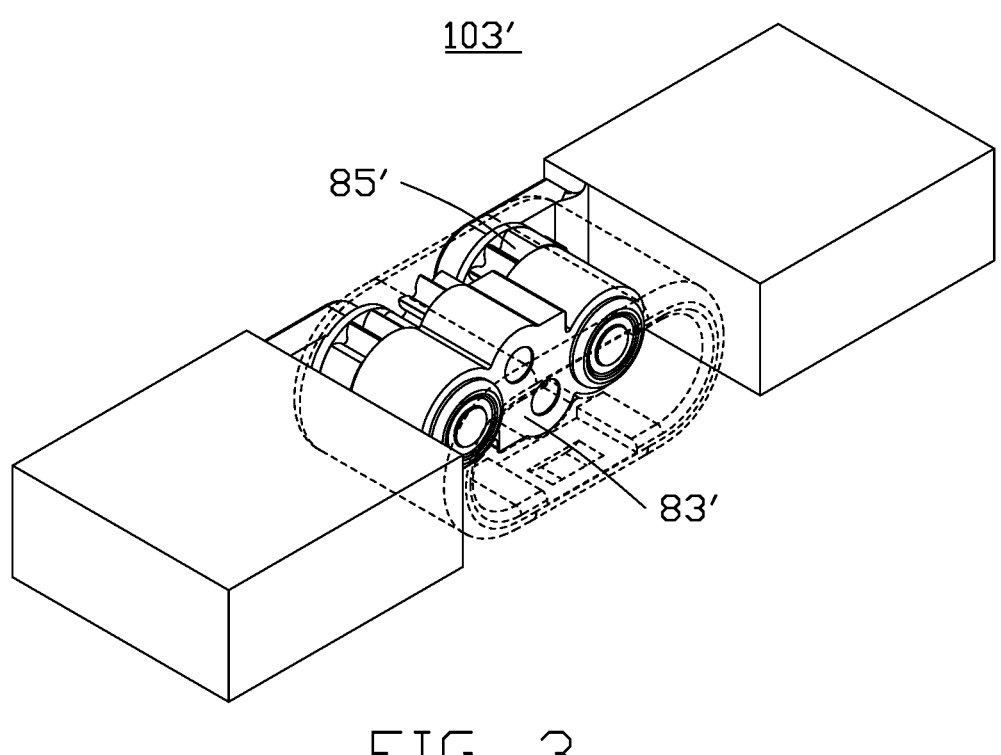
FIG. 3 is a diagrammatic view of yet another embodiment of a hinge assembly according to the related art.

Referring to FIG. 3, a hinge assembly 103' including a blocking piece 83' and a gear 85' is also provided in the related art. The blocking piece 83' abuts against and contacts one surface of the gear 85'. A friction between the blocking piece 83' and the gear 85' provides a damping force to the hinge assembly 103'. However, the blocking piece 83' reduces the length of the gear 85', and the service life of the gear 85' is correspondingly reduced. If the length of the gear 85' remains unchanged, the size of the hinge assembly 103' is increased. In addition, since the blocking piece 83' is in surface contact with the gear 85', the wear damage due to frictional heat generation is great, the attenuation of the damping force is rapid, and the service life of the hinge assembly 103' is shortened.

Figure 4:
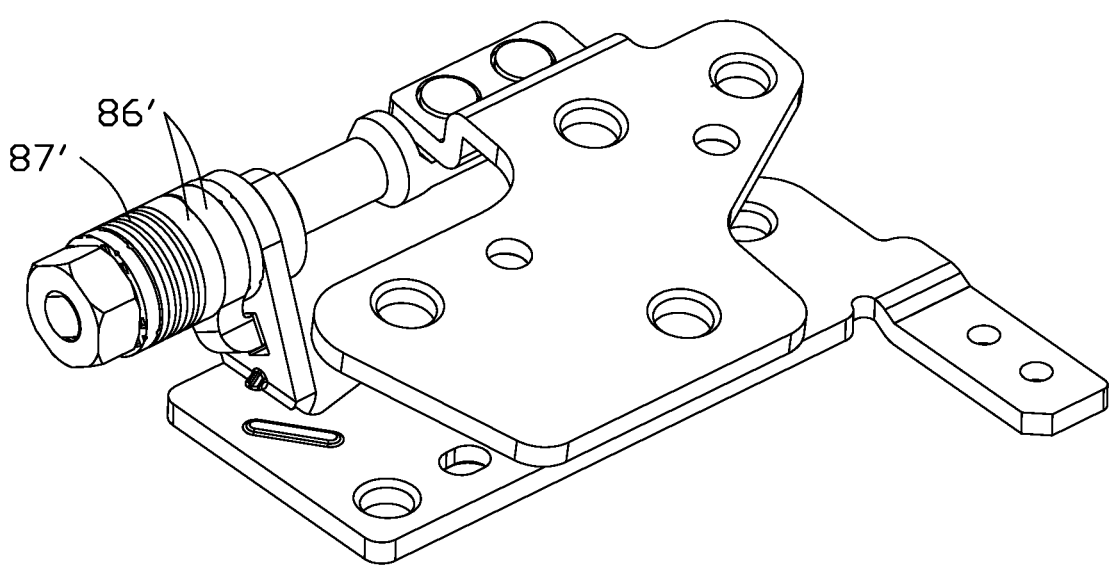
FIG. 4 is a diagrammatic view of yet another embodiment of a hinge assembly according to the related art.

Referring to FIG. 4, a hinge assembly 104' including a concave cam 86' and an elastic piece 87' is also provided in the related art. The concave cam 86' and the elastic piece 87' (or a spring) cooperate with each other to provide a damping force. The relative rotation of the concave cam 86' causes the elastic piece 87' to be compressed or rebounded, thereby changing the value of the resisting force. The hinge assembly 104' also needs to have sufficient space to allow the elastic piece 87' to be compressed and rebounded, causing the hinge assembly 104' to take up a lot of space. Similarly, reducing the size of each component of the hinge assembly 104' will shorten the service life of the hinge assembly 104'. In addition, the hinge assembly 104' can only rotate about a single axis, and the opening and closing strokes are greater.

Figure 5:
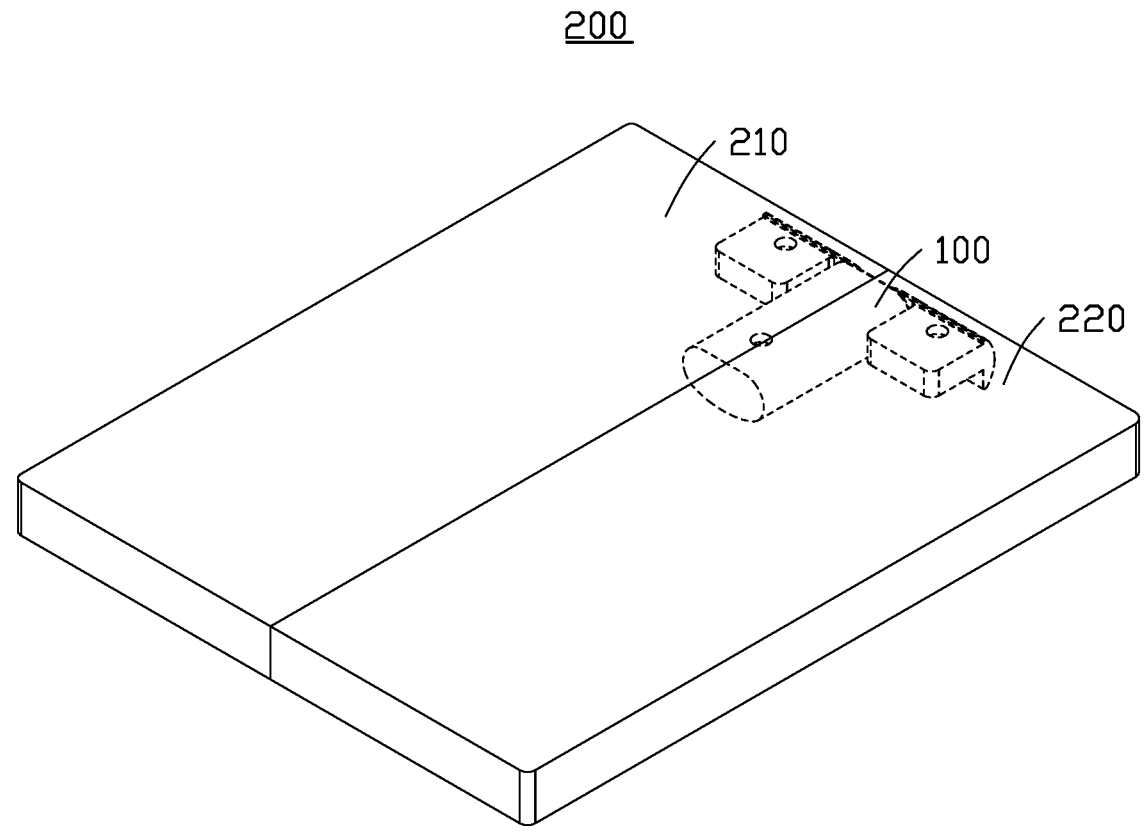
FIG. 5 is a diagrammatic view of an embodiment of a terminal device including a hinge assembly according to the present disclosure.

Referring to FIG. 5, a terminal device 200 is provided according to an embodiment of the present disclosure. The terminal device 200 includes a hinge assembly 100. The terminal device 200 may be an electronic product, including but not limited to a mobile phone, a notebook computer, a camera, a drone, a desk lamp, and the like. The terminal device 200 may also be a non-electronic product, including but not limited to a Bluetooth earphone box, a glasses box, and the like. In the embodiment, the terminal device 200 is a foldable screen mobile phone.

The terminal device 200 further includes a first body 210 and a second body 220. The hinge assembly 100 connects the first body 210 and the second body 220. Via the function of the hinge assembly 100, an included angle between the first body 210 and the second body 220 may be adjusted accordingly.

The embodiments for the first body 210 and the second body 220 of the terminal device 200 are determined based on an actual application scenario of the hinge assembly 100. For example, in the embodiment, both the first body 210 and the second body 220 are where the foldable screen is to be located. In other embodiments, when the terminal device 200 is a notebook computer, the first body 210 is where a keyboard is to be located, and the second body 220 is where a screen is to be located.

Figure 6:
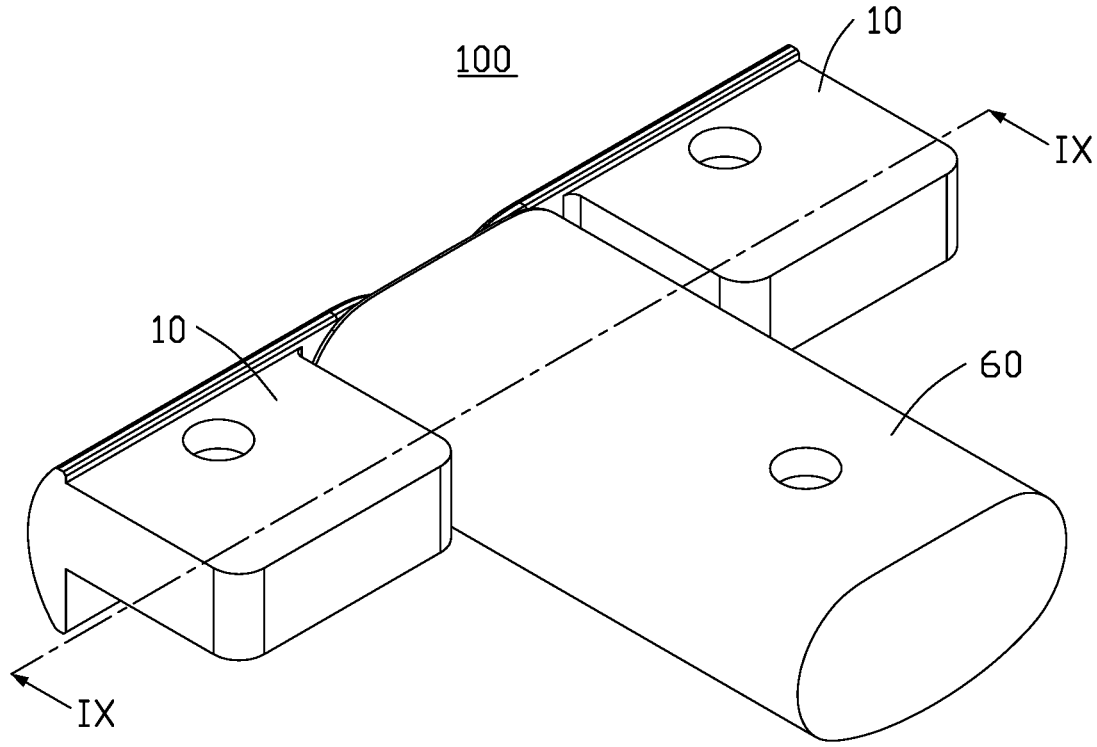
FIG. 6 is a diagrammatic view of the hinge assembly of FIG. 5.
Figure 7:
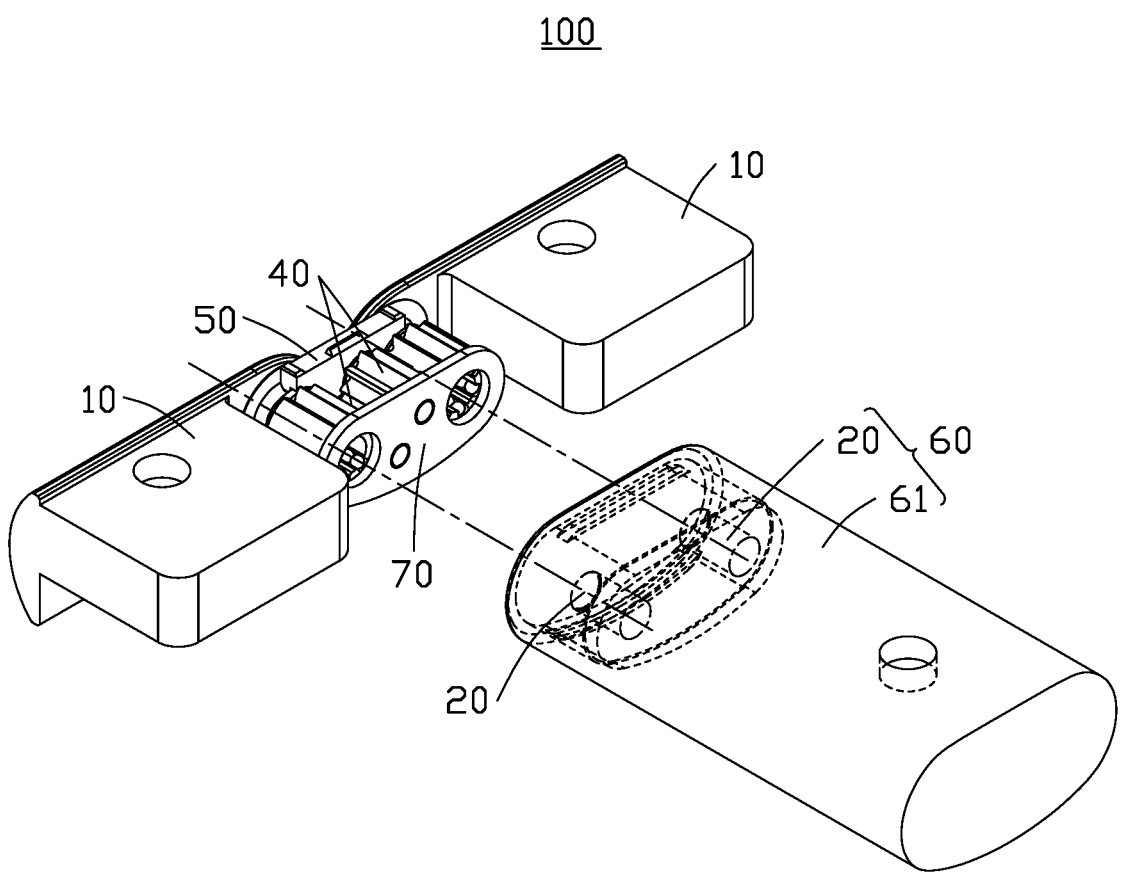
FIG. 7 is a diagrammatic view showing a barrel separated from other components of the hinge assembly of FIG. 6.
Figure 8:
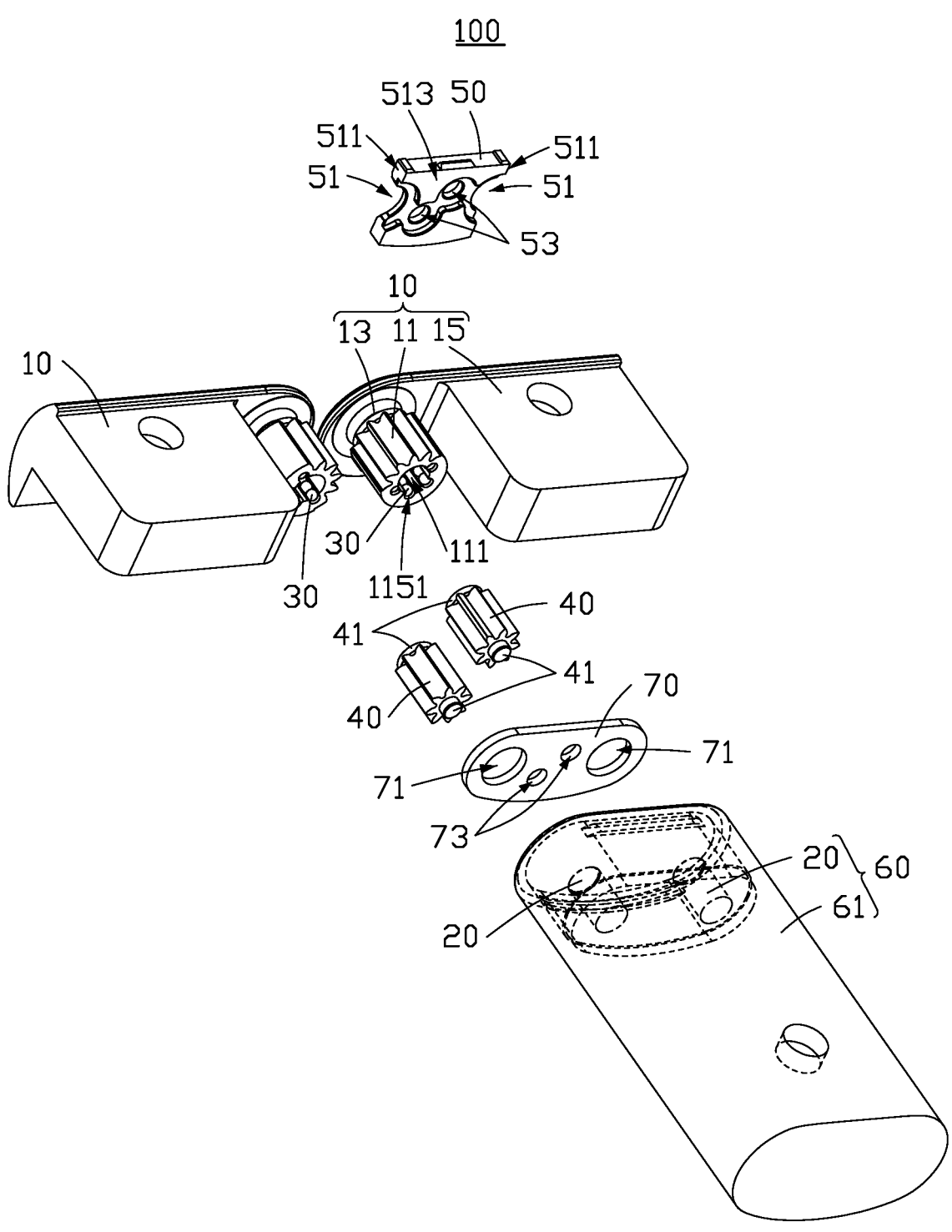
FIG. 8 is an exploded view of the hinge assembly of FIG. 6.

Referring to FIGS. 6, 7 and 8, the hinge assembly 100 includes two hinge arms 10, a plurality of balls 30, two connecting gears 40, a hinge cap 50, a fixing structure 60, and a gear lock 70. The fixing structure 60 includes two central shafts 20, and each of the two central shafts 20 passes respectively through one of the two hinge arms 10. The plurality of balls 30 are disposed between the two hinge arms 10 and the two central shafts 20 to provide a damping force. The two connecting gears 40 are engaged with the two hinge arms 10, and the hinge cap 50, the fixing structure 60, and the gear lock 70 are used to connect the various components into a whole.

Each of the two hinge arms 10 includes a gear portion 11, a connecting portion 13, and a fixing portion 15. The connecting portion 13 connects the gear portion 11 and the fixing portion 15. The fixing portion 15 of one of the two hinge arms 10 is used to mount on the first body 210, and the fixing portion 15 of the other of the two hinge arms 10 is used to mount on the second body 220.

Figure 9:
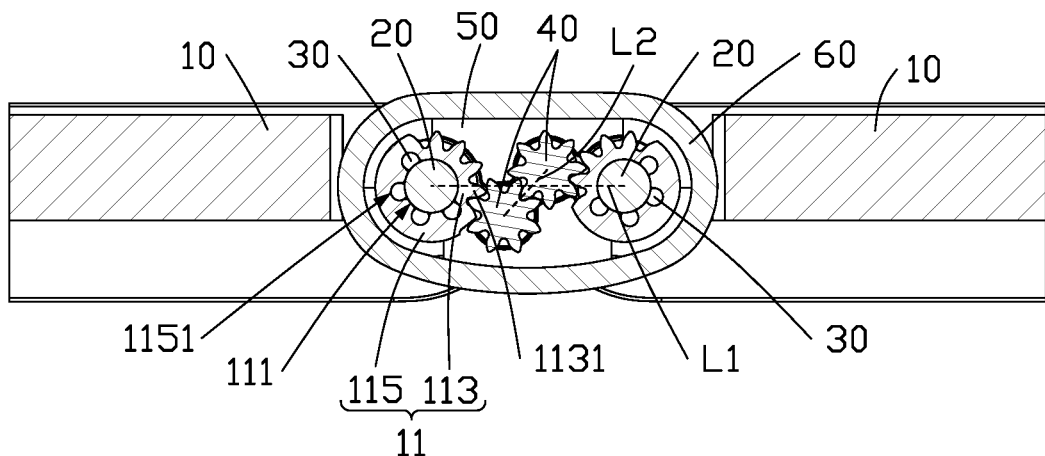
FIG. 9 is a cross-sectional view taken along line VI-VI of FIG. 6.

Referring to FIG. 9, a shaft hole 111 and at least one groove 1151 are defined on the gear portion 11, and the at least one groove 1151 connects to the shaft hole 111. Each of the two central shafts 20 can pass respectively through the shaft holes 111 so that the two hinge arms 10 can rotate about the two central shafts 20 accordingly. Each of the plurality of balls 30 is accommodated in the at least one groove 1151, and the plurality of balls 30 are in interference fit with the two central shafts 20. That is, the plurality of balls 30 are in close contact with the two central shafts 20, and the damping force is generated while the plurality of balls 30 and the two central shafts 20 are rotating relative to each other or tending to rotate relative to each other to maintain the position of the hinge arms 10. Wherein Each of the plurality of balls 30 for generating the damping force is disposed in the gear portion 11, and no additional space is required to accommodate the plurality of balls 30, thereby avoiding an increase in the size of the hinge assembly 100. In addition, each of the plurality of balls 30 is in point contact with the two central shaft 20 respectively. Thus, the contact area is smaller, the wear on the hinge assembly 100 in use is reduced, and the service life of the hinge assembly 100 is increased.

Referring to FIG. 9, the gear portion 11 includes a tooth structure 113 and a damping structure 115 arranged along the circumferential direction. The tooth structure 113 and the damping structure 115 are assembled to define the gear portion 11 and surround the two central shafts 20. Teeth 1131 are formed on a surface of the tooth structure 113 facing away from the shaft hole 111, and at least one groove 1151 is defined on a surface of the damping structure 115 facing the shaft hole 111. That is, no tooth 1131 is disposed at the position where the at least one groove 1151 is defined, so that the thickness of each of the tooth structure 113 and the damping structure 115 is appropriate, thereby preventing the gear portion 11 from being too thin and thus increasing the service life of the gear portion 11.

The number of the at least one groove 1151 may be one or more. In the embodiment, a plurality of grooves 1151 are defined on the damping structure 115, and each of the plurality of balls 30 is accommodated respectively in one of the plurality of grooves 1151, so as to increase the damping force and cause the damping force to be evenly distributed. Wherein two adjacent grooves 1151 are arranged at intervals, so that the thickness of the damping structure 115 between two adjacent grooves 1151 is appropriate, thereby further improving the service life of the gear portion 11.

A certain assembly gap is defined between an inner surface of the gear portion 11 and the two central shafts 20, so that no friction is generated when the gear portion 11 rotates about one of the two central shafts 20 respectively, which can improve the user's experience when opening or closing the terminal device 200.

Each of the two connecting gears 40 is disposed between the two hinge arms 10 and engages with each other. One of the two connecting gears 40 is further engaged with the gear portion 11 of one of the two hinge arms 10, and the other one of the two connecting gears 40 is further engaged with the gear portion 11 of the other one of the two hinge arms 10. The two hinge arms 10 are engaged via the two connecting gears 40, so that the two hinge arms 10 can be rotated synchronously.

A rod portion 41 (referring to FIG. 8) is disposed at the end of each of the two connecting gears 40. The rod portion 41 can limit the rotation of the two connecting gears 40 without displacement.

In the embodiment, a line connecting the centers of the two central shafts 20 is defined as a first line segment L1, a line connecting the centers of the two connecting gears 40 is defined as a second line segment L2. The first line segment L1 intersects with the second line segment L2. That is, the central shafts 20 and the two connecting gears 40 do not lie on the same straight line, which can save the installation space for the hinge assembly 100.

In some embodiments, the two connecting gears 40 can be omitted, or the number of the two connecting gears 40 is not limited to two, as long as the two hinge arms 10 can be rotated relative to each other.

The hinge cap 50 is roughly in the shape of a sheet. The hinge cap 50 includes two opposite first sides 511 and a second side 513, each of the two first side 511 is connected and perpendicular to the second side 513. Two slots 51 are defined at two opposite ends of the hinge cap 50. Each of the two slots 51 is formed by a recess of the two first sides 511 respectively. Each of the two slots 51 is roughly C-shaped, and the two slots 51 are disposed opposite to each other. Each of the two slots 51 is connected to the connecting portion 13 of one of the two hinge arms 10 respectively, the connecting portion 13 passes through one of the two slots 51 respectively, and the hinge cap 50 assembles the two hinge arms 10 as a whole.

Two accommodating grooves 53 are defined on the surface of the hinge cap 50 facing the two connecting gears 40 respectively, the two accommodating grooves 53 are formed by a recess of the second side surface 513. A concave direction for the two accommodating grooves 53 is perpendicular to a concave direction for the two slots 51. The two accommodating grooves 53 can accordingly accommodate the rod portion 41 of the two connecting gears 40 respectively to confine the two connecting gears 40, so that the two connecting gears 40 just can only rotate but not move.

The fixing structure 60 further includes a barrel 61 which is substantially hollow. The barrel 61 and the two central shafts 20 are fixed to each other. In the embodiment, the barrel 61 and the two central shafts 20 are integrally formed. In other embodiments, the fixing method of the barrel 61 and the two central shafts 20 is not limited, and the two central shafts 20 are disposed in the barrel 61 at intervals and in parallel. The gear portions 11, the two connecting gears 40, and the hinge cap 50 are accommodated in the barrel 61, so that the components can be assembled as a whole, and the two hinge arms 10 can rotate about their respective central shafts 20.

The gear lock 70 is sheet-shaped and includes two through holes 71 and two through holes 73. The two central shafts 20 pass through the two through holes 71 respectively. The rod portions 41 of the two connecting gears 40 pass through the two through holes 73 respectively. The gear lock 70 is accommodated in the barrel 61 and fixedly assembled to the barrel 61.

In order to more clearly illustrate that the two hinge arms 10 in the hinge assembly 100 realize the synchronous rotating and damping functions in the embodiment, referring to FIGS. 9, 10, and 11, and the closing process of the hinge assembly 100 provided in the embodiment will be described in detail below.

Referring to FIG. 9, the hinge arms 10 are on the same plane, that is, the included angle between the two hinge arms 10 is 180°, and the two hinge arms 10 are in an open state.

Figure 10:
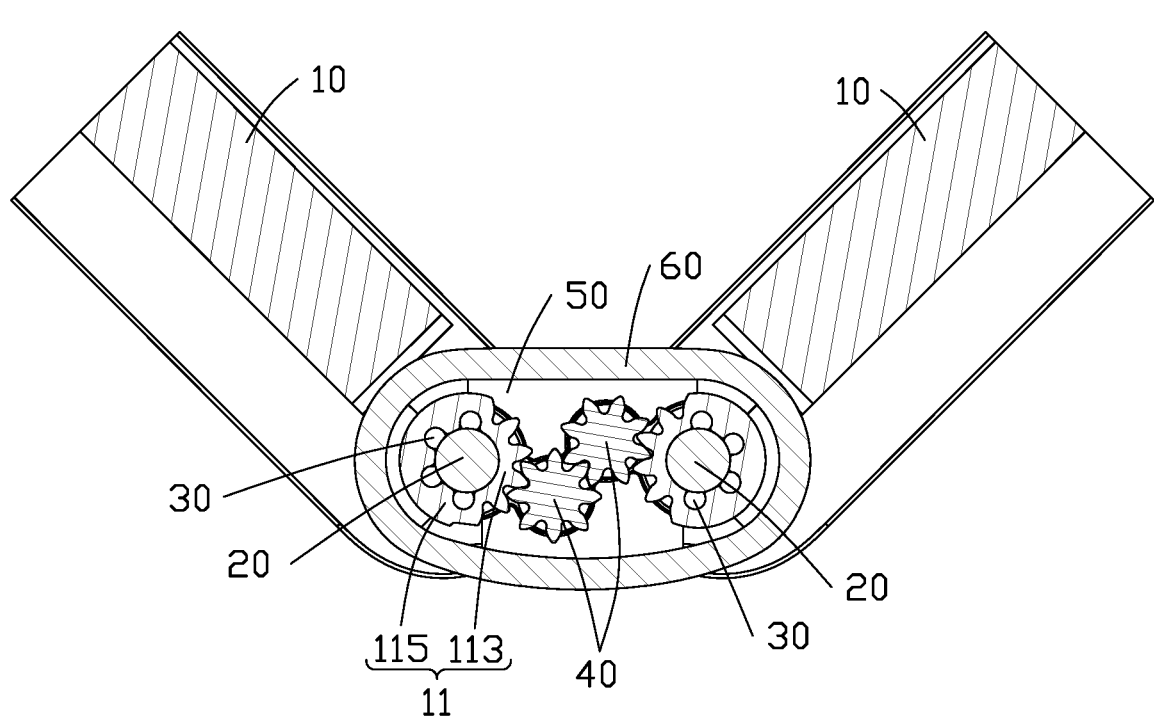
FIG. 10 is similar to FIG. 9 but shows two hinge arms of the hinge assembly rotated to be perpendicular to each other.

Referring to FIG. 10, an external force is applied to the two hinge arms 10, so that a torque on the two hinge arms 10 is larger than the friction between the plurality of balls 30 and the two central shafts 20. The two hinge arms 10 rotate relative to the two central shafts 20 respectively, and the rotation of the two hinge arms 10 drives the two connecting gears 40 to rotate. When the included angle between the two hinge arms 10 reaches the included angle required for actual use (in the embodiment, it is specifically 90°), after the external force is removed, the damping force generated by the friction between the plurality of balls 30 and the two central shafts 20 can maintain the position of the two hinge arms 10. Wherein each of the two hinge arms 10 rotates at an angle of 45° relative to the respective central shaft 20, which means that each of the two hinge arms 10 can save half of the stroke.

Figure 11:
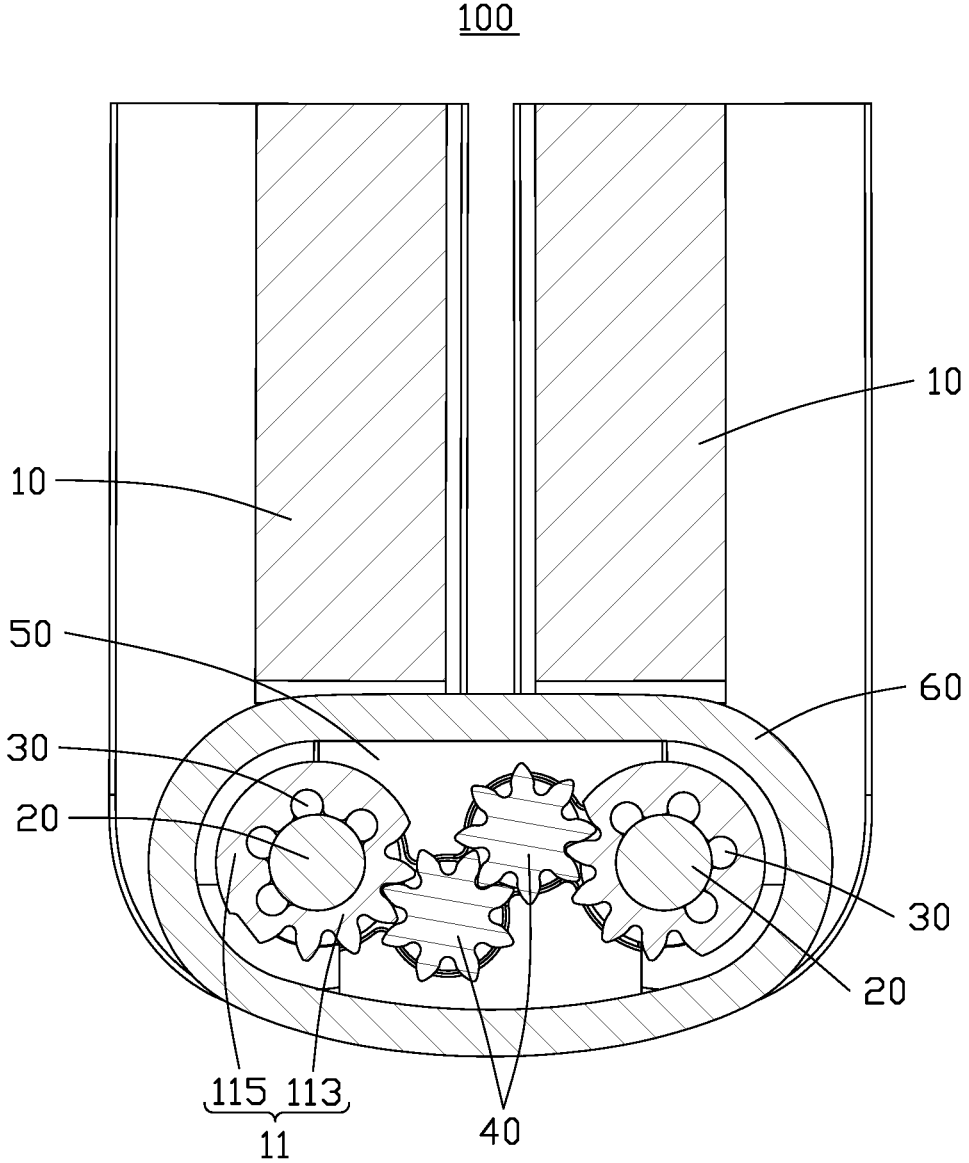
FIG. 11 is similar to FIG. 10 but shows the two hinge arms rotated to be parallel to each other.

Referring to FIG. 11, the external force is applied to the two hinge arms 10 again, so that the torque on the two hinge arms 10 can overcome the friction between the plurality of balls 30 and the two central shafts 20. The two hinge arms 10 continue to rotate relative to the central shafts 20 respectively, and the rotation of the two hinge arms 10 drives the two connecting gears 40 to rotate until the included angle between the two hinge arms 10 is 0°, that is, the hinge assembly 100 is in a closed state.

Figure 12:
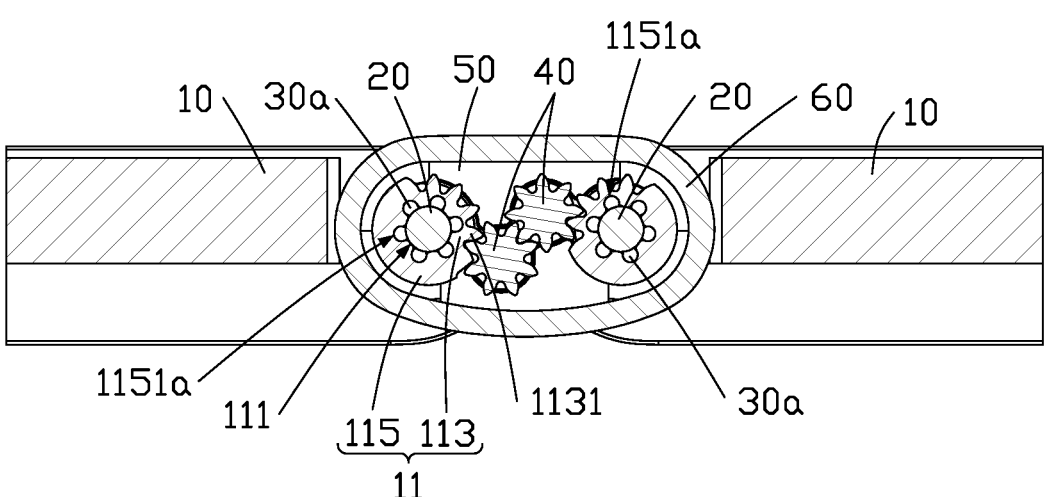
FIG. 12 is a diagrammatic view of another embodiment of a hinge assembly according to the present disclosure.

Referring to FIG. 12, another hinge assembly 100a is provided according to another embodiment of the present disclosure. In the embodiment, when the service life of the gear portion 11 of each of the two hinge arms 10 is satisfied, at least one groove 1151a is defined on the surface of the tooth structure 113 facing the shaft hole 111. Each of the plurality of balls 30a is accommodated in the at least one groove 1151a, so as to increase the damping force and cause the distribution of the damping force to be more uniform.

Figure 13:
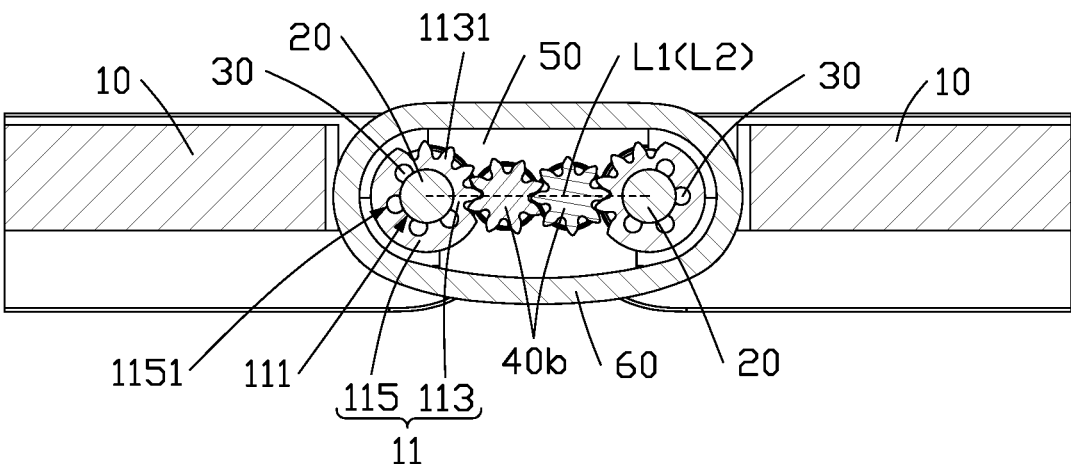
FIG. 13 is a diagrammatic view of yet another embodiment of a hinge assembly according to the present disclosure.

Referring to FIG. 13, another hinge assembly 100b is provided according to another embodiment of the present disclosure. In the embodiment, the first line segment L1 and the second line segment L2 are parallel to each other. Wherein the first line segment L1 and the second line segment L2 are parallel to each other including the coincidence of the first line segment L1 and the second line segment L2, that is, the two central shafts 20 and the two connecting gears 40b are on the same straight line.

Figure 14:
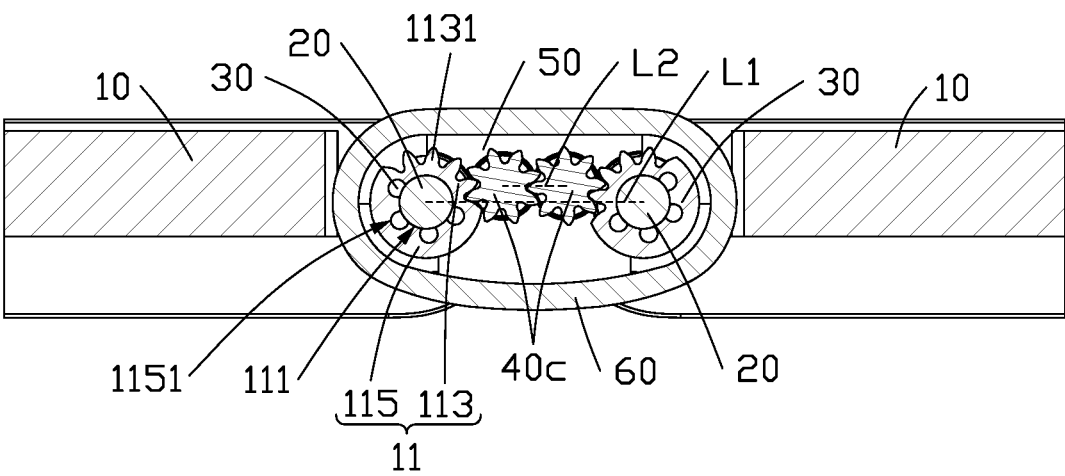
FIG. 14 is a diagrammatic view of yet another embodiment of a hinge assembly according to the present disclosure.

Referring to FIG. 14, another hinge assembly 100c is provided according to another embodiment of the present disclosure. In the embodiment, the first line segment L1 and the second line segment L2 are parallel to each other. Wherein the two central shafts 20 and the two connecting gears 40c may not be on the same straight line.

The hinge assembly 100, 100a, 100b, 100c provided in the embodiments of the present disclosure generates the damping force through the interference fit between the plurality of balls 30,30a and the two central shafts 20, and the point contact between each of the plurality of balls 30,30a and the respective central shaft 20 replaces the surface contact in the related art, thereby improving the service life of the hinge assembly 100, 100a, 100b, 100c. The hinge assembly 100, 100a, 100b, 100c replaces the cam-type hinge assembly 102' used in the related art, and the hinge assembly 100, 100a, 100b, 100c has no pause during the rotation process, and the rotation is smooth. Each of the plurality of balls 30,30a is accommodated in the at least one groove 1151,1151a of the gear portion 11 of one of the two hinge arms 10 respectively, thereby preventing the hinge assembly 100, 100a, 100b, 100c from increasing in size.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A hinge assembly comprising:
two hinge arms, each of the two hinge arms comprising a gear portion, the gear portion comprising a tooth structure and a damping structure, a shaft hole and at least one groove defined on the gear portion, and the shaft hole connecting to the at least one groove, the at least one groove defined on a surface of the damping structure facing the shaft hole;
a fixing structure comprising two central shafts and a barrel, the barrel and the two central shafts fixed to each other, each of the two central shafts passing through the shaft hole, the tooth structure and the damping structure correspondingly surrounding one of the two central shafts;

a plurality of balls, each of the plurality of balls accommodated in the at least one groove, wherein the plurality of balls are in interference fit with the two central shafts;

two connecting gears engaged with each other, disposed between the two hinge arms, and each of the two connecting gears is correspondingly engaged with the gear portion;

a hinge cap, wherein two slots are defined at two opposite ends of the hinge cap, respectively, each of the two hinge arms further comprises a connecting portion connected to the gear portion, the connecting portion passes through a respective slot of the two slots, and the hinge cap is fixedly assembled to the barrel; and a gear lock comprising four through holes, wherein the two central shafts pass through two respective through holes of the four through holes, the two connection gears pass through the two respective through holes, respectively, and the gear lock is fixedly assembled to the barrel.

2. The hinge assembly of claim 1, wherein the at least one groove is further defined on a surface of the tooth structure facing the shaft hole.

3. The hinge assembly of claim 1, wherein a line connecting the centers of the two central shafts is defined as a first line segment, a line connecting the centers of the two connecting gears is defined as a second line segment, and the first line segment intersects with the second line segment.

4. The hinge assembly of claim 1, wherein a line connecting the centers of the two central shafts is defined as a first line segment, a line connecting the centers of the two connecting gears is defined as a second line segment, and the first line segment is parallel to the second line segment.

5. A terminal device, comprising:

a first body;

a second body; and a hinge assembly, the hinge assembly comprising:

two hinge arms, each of the two hinge arms comprising a gear portion, the gear portion comprising a tooth structure and a damping structure, a shaft hole and at least one groove defined on the gear portion, and the shaft hole connecting to the at least one groove, the at least one groove defined on a surface of the damping structure facing the shaft hole;

a fixing structure comprising two central shafts and a barrel, the barrel and the two central shafts fixed to each other, each of the two central shafts passing through the shaft hole, the tooth structure and the damping structure correspondingly surrounding one of the two central shafts;

a plurality of balls, each of the plurality of balls accommodated in the at least one groove, wherein the plurality of balls are in interference fit with the two central shafts;

two connecting gears engaged with each other, disposed between the two hinge arms, and each of the two connecting gears is correspondingly engaged with the gear portion;

a hinge cap, wherein two slots are defined at two opposite ends of the hinge cap, respectively, each of the two hinge arms further comprises a connecting portion connected to the gear portion, the connecting portion passes through a respective slot of the two slots, and the hinge cap is fixedly assembled to the barrel; and a gear lock comprising four through holes, wherein the two central shafts pass through two respective through holes of the four through holes, the two connection gears pass through the two respective through holes, respectively, and the gear lock is fixedly assembled to the barrel.

6. The terminal device of claim 5, wherein the at least one groove is further defined on a surface of the tooth structure facing the shaft hole.

7. The terminal device of claim 5, wherein a line connecting the centers of the two central shafts is defined as a first line segment, a line connecting the centers of the two connecting gears is defined as a second line segment, and the first line segment intersects with the second line segment.

8. The terminal device of claim 5, wherein a line connecting the centers of the two central shafts is defined as a first line segment, a line connecting the centers of the two connecting gears is defined as a second line segment, and the first line segment is parallel to the second line segment.

9. The terminal device of claim 5, wherein further comprising a foldable screen; both the first body and the second body are where the foldable screen is to be located.

10. The terminal device of claim 5, wherein further comprising a keyboard and a screen; the first body is where the keyboard is to be located, and the second body is where the screen is to be located.

* * * * *